Patented Mar. 6, 1951

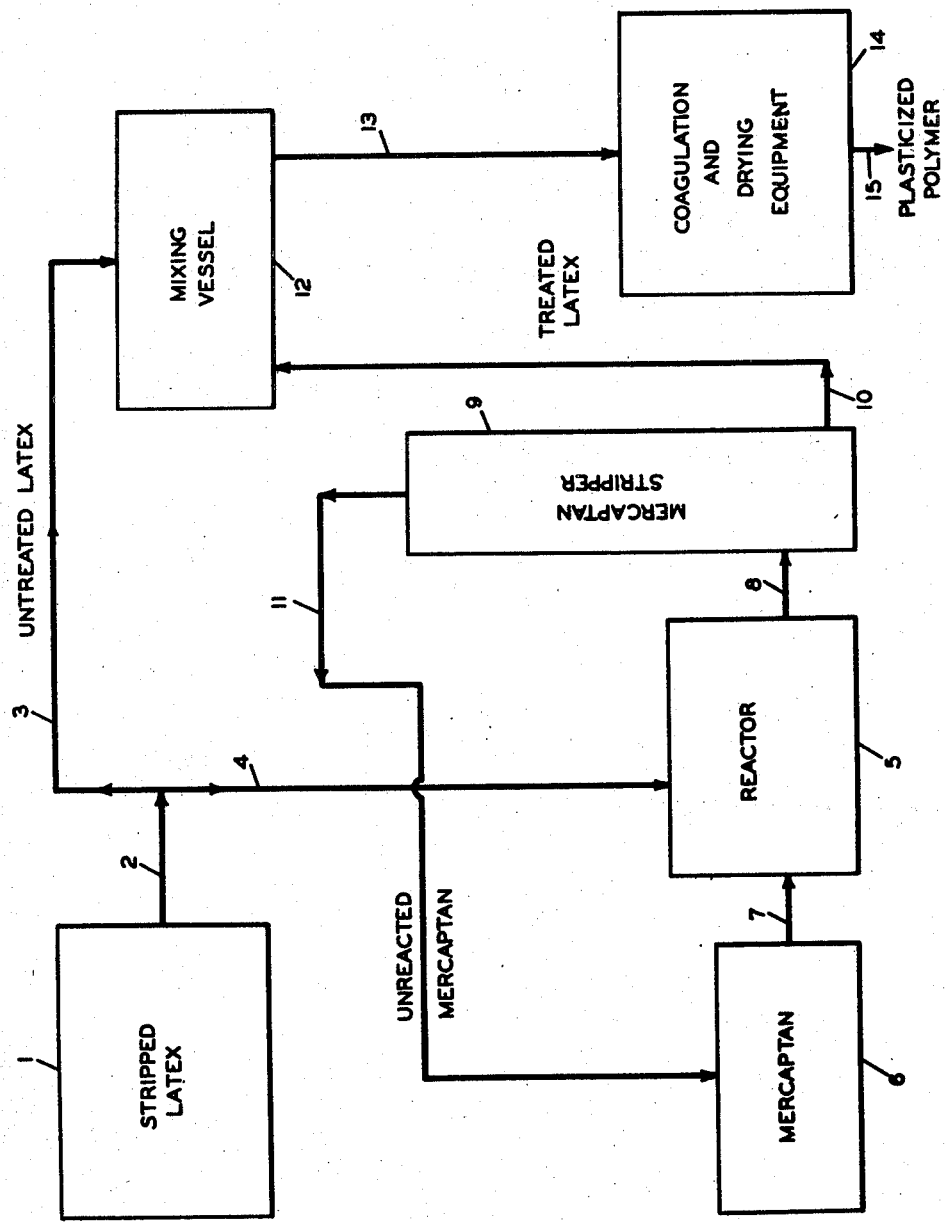

2,543,845

UNITED STATES PATENT OFFICE 2,543,845

PLASTICIZING SYNTHETIC RUBBER WITH A REACTION PRODUCT OF AN ALKYL MERCAPTAN AND SAID RUBBER

Charles F. Fryling, Bartlesville, Okla., assignor to Phillips Petroleum Company, a corporation of Delaware Application August 27, 1945, Serial No. 613,007

11 Claims. (Cl. 260—29.7)

This invention relates to a novel process for plasticizing synthetic rubber and to a novel method for preparing a plasticized and readily worked synthetic rubber product and the product of such method.

Synthetic rubber polymers when subjected to milling, especially in the process of compounding with various fillers, antioxidants, etc., just prior to vulcanization generally require the use of a plasticizer to aid in this working process. In any event some softening action is required. Heretofore, all these processes have been of a chemical nature, and have resulted in more or less breakdown of all the molecules to products of lower molecular weight with consequent loss of quality. Furthermore, only a few chemical substances in any degree satisfactory for this purpose are known. The oxidative breakdown which occurs in the mechanical milling in air has consequently been most used in spite of its numerous disadvantages.

High molecular weight synthetic rubbers are sometimes produced, either accidentally or deliberately, and their utilization has been very difficult if not impossible. Not much value is attached to tough high molecular weight rubbers resulting from cross linkage, but those high weight rubbers in which the molecules are substantially linear hold a great deal of promise. They have great elongation and tensile strength and high Mooney viscosity, but are very tough and hard to work. They require the consumption of large amounts of energy in the milling process, and their application has, therefore, been extremely limited, if it is possible to mill them in any case.

Synthetic rubber, as referred to herein, is intended to include synthetic rubber-like materials made by the emulsion polymerization of conjugated diolefins or butadiene-1,3 hydrocarbons or substituted derivatives thereof such as the haloprenes, either alone or in admixture with each other or with monomers copolymerizable therewith. The term polymer as used herein includes copolymers as well as products of polymerization of a single monomer. Conjugated diolefins include butadiene-1,3 itself, and the hydrocarbon homologs thereof such as isoprene, piperylene, 2,3-dimethylbutadiene, and the like. Such monomers include in general readily polymerizable compounds containing an olefinic group, particularly a single olefinic group which is usually activated due to its presence at the end of a chain, as a vinyl group, or a vinylidene group, or in a conjugated system. Monomers suitable for this purpose are, for example, aryl olefins such as styrene, p-chlorostyrene, vinyl naphthalene, etc.; acrylic and substituted acrylic acids and their esters, nitriles and amides such as acrylic acid, methyl acrylate, ethyl acrylate, methyl methacrylate, ethyl methacrylate, acrylonitrile, ethacrylonitrile, methacrylamide and the like; methyl vinyl ether, methyl isopropenyl ketone, vinylpyridine, vinylidine chloride, vinylfurane, vinyl acetate, diethyl fumarate, etc. This emulsion polymerization produces a latex or latex-like dispersion.

Other synthetic rubber-like materials produced by emulsion polymerization may also be reacted with alkyl mercaptans to form the novel materials disclosed herein. Such rubbers include the chloroprene polymers, such as neoprene and the like.

In my copending application, Serial No. 613,006, entitled Plasticizing Synthetic Rubber, filed of even date herewith I have described the use of new plasticizer compositions which act by physical rather than by chemical means. These new plasticizer compositions comprise the products resulting from the interaction of mercaptans with synthetic rubber latex, particularly GR–S latex. Using these products the plasticing action takes place very rapidly on the mill, in many cases being almost immediate, and softening action is very complete. No undesirable oxidative reactions take place, but most important, the plasticization occurs with but very little breakdown of the molecules of the rubber, and therefore, little alteration in the characteristics of the original polymer fed to the mill. As above stated the plasticization takes place by physical means on mixing-in my novel compositions and not through chemical breakdown of the molecules. It is, therefore, possible to apply my process to the aforementioned very desirable high molecular weight linear polymers which cannot generally be worked in ordinary processes, at least without entirely impracticable energy consumptions. These tough rubbers are readily and quickly softened and yet retain their long chain, high molecular weight structure with all the attendant advantages in tensile strength, Mooney viscosity, etc. and the ability to use such polymers has proved one of the great advantages of my new process.

It is a principal object of the present invention to provide a novel process for plasticizing synthetic rubber. It is a further object of the present invention to provide a novel plasticized rubber. It is a still further object of the present invention to incorporate my novel plasticizing material in a novel and efficacious manner.

In the practice of my invention as described in the aforesaid copending application, it has been customary to treat the latex, usually a normal GR-S latex, with the desired quantity of mercaptan, such as ethyl or tert-butyl mercaptan, reacting at a temperature of about 30 to 150° F. for 1 to 24 hours until the desired degree of saturation has been reached, and then coagulating the modified latex. After the resulting soft or liquid syrupy plasticizer has been recovered and dried, it is employed in plasticizing the rubber on the ordinary mills, or in Banbury machines, "plasticators," etc., in manner well known. After the compounding, vulcanization is carried out and my plasticizer takes part in this reaction, being itself a vulcanizable substance and vulcanizing agent. However, one disadvantage in the employment of these compositions has heretofore been in the difficulties attendant upon the coagulation of the soft or liquid plasticizers. The reaction between the latex and the mercaptan proceeds without difficulty and requires no very special equipment, but the subsequent coagulation and drying steps are not as simply carried out as with the untreated latex. In coagulation in the regular equipment provided for this purpose, the rubber tends to "ball up." It is very difficult in this condition to wash free of the soap and other components of the emulsion, coagulants, etc. The more liquid syrups are particularly hard to handle. Difficulties are attendant upon the drying of this plasticizer also. The soft rubbers or syrups will tend to flow on heating. In most cases special trays or other modification of the drying equipment will be absolutely necessary to operation, and present equipment is completely inadequate for these operations. Skin effects in drying are likely to slow down greatly the rate of removal of water also, and other operating difficulties arise.

I have now found that I may obviate these disadvantages and operate successfully to prepare and use my novel plasticizer compositions by a process comprising dividing the synthetic rubber latex stream into portions, passing one portion of this stream to a reactor where the mercaptan-latex reaction is carried out, stripping it, and recombining the treated latex with another portion of the untreated latex in a mixing vessel. The resulting mixed latex may then be coagulated in the usual manner and dried without difficulty. The rubber is then milled and the plasticizing action of the mercaptan-treated product which has taken place is at once evident. It is an advantage of this improved method of operating that no special equipment is required for the coagulation and drying and the existing machinery is suitable for and has the capacity to handle the entire lot. It is a further advantage of my process that the plasticizer produced is of the same type as the polymer in each case, assuring ready miscibility of the softener and polymer.

In its more general embodiment, my invention comprises the steps of (1) dividing the stream of stripped latex into a major and minor stream, (2) passing the minor one of these streams to a reactor together with the requisite amount of an aliphatic mercaptan, (3) allowing the said mercaptan to react under suitable conditions with the latex to secure the desired degree of saturation of the double bonds by mercaptan, (4) passing the reacted latex to a mercaptan stripper wherein the unreacted mercaptan is removed as an overhead product and recycled; (5) passing the treated, stripped latex therefrom to a mixing vessel and thoroughly incorporating with the major stream of the original untreated latex; and, (6) passing the mixed latices to a coagulator, coagulating therein by any desired normal process, and drying the coagulant in the usual manner. Compounding the mixed coagulant on the mill, or in Banburys is then carried out in the normal manner. The invention may be more readily understood by reference to the accompanying drawing, which is a diagrammatic representation of the flow of the latex streams in my process.

In the drawing, stripped latex from the supply in tank 1 passes out through line 2 and is divided into two streams. The major portion passes through line 3, and the minor proportion is removed through line 4 and passes into reactor 5. A suitable mercaptan, such as ethyl, t-butyl or dodecyl, is withdrawn from the supply in tank 6 and enters the reactor 5 through line 7. Reaction proceeds in this vessel for the required time to secure saturation of a certain proportion of the double bonds in the polymer. The treated latex is then passed by line 8 to mercaptan stripper 9. The recovered mercaptan is returned to the mercaptan storage through recycle line 11. The treated stripped latex passes through line 10 to the mixing vessel 12. The major portion of the latex, which is untreated, flowing through line 3, also enters mixing vessel 12. Here the two lots are thoroughly mixed by any suitable means. The mixed latices leave by line 13 and enter the usual coagulating and drying operations designated as 14 on the drawing. This may include both creaming and coagulating operations with salt and acid respectively, and the requisite washing and filtration operations prior to drying in the customary air ovens. The polymer so produced is fully plasticized. It is generally desired at this point to compress the polymer into blocks or bale it for storage or shipment. But when it is subjected to the action of the mill in subsequent compounding operations the polymer is found to be plastic and the effect of the softener incorporated all through it is very complete. In a single pass through the mill the polymer will be well masticated.

My process is applicable to synthetic rubber latex or emulsions of synthetic rubber-like material of the types discussed herein and is not necessarily confined to GR-S latex which is described by way of example only. Other rubbers, such as GR-A (acrylonitrile-butadiene copolymer) may be handled in a similar manner. Generally a latex is desired for preparation of a softener which is similar to the latex to be softened, and in my improved process it is obvious that the latex will always be identical.

The preparation of the latex which is diverted and converted to a softener may be varied over a wide range as the conditions dictate. Generally the quantity used will be from 5 to about 15 or 20 per cent of the stream, but may be even higher. Quantities above 50 per cent diverted for this purpose are seldom used. It is an advantage of my process that the quantity of softener prepared and used can be regulated individually and continuously to suit the needs of the polymer produced, simply by varying the proportions of the stream diverted to this purpose. While theoretically the quantity of softener might rise to a major proportion of the total stream in the case of very tough rubbers and/or a plasticizer composition of very mild action, such will very seldom be the case. Generally the limit of 50 per cent will not be reached and the usual quantities of the normal plasticizer compositions which are employed lie in the range from about 5 to about 15 per cent.

The plasticizer prepared in my process, as revealed in my copending application referred to above may vary from the consistency of a soft rubber to a viscous syrup, depending upon the degree of saturation by mercaptan, and on the particular mercaptan employed. The consistency of the softener prepared will roughly parallel its activity in plasticizing in any given preparation. Hence, the proportion of the softener used will depend upon its mercaptan saturation, and the more highly saturated products will in general require a smaller quantity to plasticize the major quantity of the polymer stream. While to a certain extent satisfactory results may be obtained both by a small quantity of highly modified latex and by progressively larger quantities of less highly modified latices and a considerable latitude of choice is allowed, nevertheless certain qualitative differences in the action will usually be present. The best type of softener to use will normally be determined by experiment in any given case, and such an optimum softener and concentration thereof will generally exist.

The consistency of the plasticizer produced as well as its subsequent action are to a considerable extent determined by the individual mercaptan used. Depending also on this identity of the reagent, the quantity required to produce a syrup of any given viscosity will vary. The $C_1$ and higher alkyl mercaptans have been found suitable for use in the present process. Such mercaptans, by way of example, include the normal mercaptans such as methyl mercaptan, ethyl mercaptan, butyl mercaptan, hexyl mercaptan, octyl mercaptan, n-dodecyl mercaptan, hexadecyl mercaptan, etc., as well as the corresponding tertiary mercaptans. In general the $C_1$—$C_{16}$ mercaptans are preferred. The use of these products and their relation to the plasticizers produced is fully discussed in my copending application.

As disclosed in my aforesaid copending application, the amount of mercaptan to be added is determined by the extent of saturation of the double bonds of the polymer which it is desired to effect. Differences in rate of reaction of various mercaptans with the latex exist, and from a practical viewpoint may serve to limit the degree of saturation. The quantity and rate of addition of mercaptan, as well as reaction condition, catalyst used, etc., will determine the amount of mercaptan reacted or the degree of saturation of the rubber. In general sufficient mercaptan is added to effect saturation of at least 1% of the double bonds of the polymer. For example, GR-S latex containing 100 grams of rubber treated with 90 grams of n-dodecyl mercaptan over a period of 2½ hours at 122° F., in the presence of oxygen bubbled into the stirred mixture, produced a product which was 14% saturated after coagulation and removal of excess mercaptan. The same amount of latex treated with 31 grams of tertiary butyl mercaptan in a similar manner for six hours gave a product which was 12 per cent saturated.

The reactor required is relatively simple as indicated by the reaction conditions shown. A temperature of about 120° F. is usually used and only very moderate, if any, pressure. A reaction period of several hours, with agitation is required. Similarly, the mercaptan stripper is of a conventional type, and may comprise, for instance, a simple vacuum stripping still. It should be noted that said equipment for preparing the softener for use will be required in any process employing my novel plasticizers, and is not an added requirement of the split stream method of processing in any sense.

The preparation and stripping of the latex-mercaptan adduct presents no problems in handling. According to the process of my invention, when I rejoin the stream of the mercaptan treated latex to the larger stream of untreated latex and thoroughly agitate, I experience no difficulties in the coagulation process. The regular rubber handling machinery is entirely adequate, and in most cases no differences of consequence can be noticed in its processing characteristics. The washing and drying operations likewise proceed normally on the installed, ordinary equipment. The mixing equipment required is relatively simple, and may consist of an agitated tank. Mixing may even take place sufficiently well in a centrifugal mixing pump and in the agitated coagulating vessels. As I have pointed out, if the plasticizer is coagulated and dried and prepared for use separately, additional equipment will be required, and it will of necessity be of different type, more complex and difficult to operate, and processing troubles will probably be experienced.

The polymer as coagulated appears very homogeneous in appearance, and is thoroughly plasticized as becomes evident as soon as the material is placed on the compounding mill. The polymer is masticated at once as it goes through the mill and incorporation of compounding ingredients may be started immediately. No preliminary period of milling to incorporate the softener is necessary. The particles of the plasticizer in the latex are so intimately mixed with those of the polymer that the coagulated particles quite uniformly comprise sufficient plasticizer.

*Example I*

A stream of GR-S latex prepared in the normal manner was divided in the proportion of 95 to 5, and the smaller stream passed to a reactor, where it was treated with sufficient ethyl mercaptan to saturate double bonds in the latex and allowed to react four hours at 122° F. in the presence of oxygen. The product was then passed to the stripper, where the unreacted mercaptan was removed under vacuum at low temperature. The product obtained analyzed, on removal of a small sample and coagulating and drying said sample, 65 per cent saturation of the double bonds, and was a viscous syrup very hard to handle. The uncoagulated stream, however, was run back into the major untreated latex stream and mixed by means of a circulating pump and tank. The mixed latex was then creamed with salt solution, coagulated with dilute acid, washed and dried in the usual dryers. The crumb produced was dry, of good consistency, not sticky or too soft, and presented no operating difficulties.

When the dried polymer was later put on the compounding mill, it was found to be plasticized completely, and worked very readily. After its first pass through the mill, it had the appearance of well masticated rubber.

Example II

A stream of GR–S latex was divided in the proportion of 90 to 10, and the minor stream treated with ethyl mercaptan as in the previous example, except that the reaction was so regulated as to secure only 35 per cent saturation with mercaptan. On recombining the streams and coagulating the mixed latex, a satisfactory crumb was obtained which processed readily and was very similar to that obtained in the first example. The dried polymer was found to be completely plasticized when passed through the mill.

Example III

A batch of GR–S latex of normal characteristics was divided in the proportion 90 to 10, and the smaller stream reacted with t-butyl mercaptan at 122° F. for 20 hours. A product which coagulated to a syrup with 10 per cent saturation of the double bonds was obtained. After mixing the latices, a normal crumb was obtained on coagulating, which gave no processing difficulties. The polymer was found to be satisfactorily plasticized when treated on the mill.

Example IV

A batch of GR–S latex which was undermodified and gave a very tough polymer on coagulation, consisting of very high molecular weight linear polymer, was divided in the proportion 85 to 15. The smaller stream passed to the mercaptan reactor where it was allowed to react 4 hours with n-dodecyl mercaptan at 122° F. After stripping, the streams were recombined. The modified polymer showed on analysis of a sample 30 per cent saturation of the bonds, and was syrupy. The combined latex coagulated and dried without trouble, and did not have the appearance or toughness of a sample of the original latex after the same processing. The polymer was readily worked on the mill, with ordinary energy consumption, and yielded vulcanized products of very high tensile strength and elongation due to the nature of the original polymer. Untreated samples of the original could not be milled.

Example V

A sample of normal GR–S latex was divided in the ratio 60 to 40. The smaller stream was reacted with n-dodecyl mercaptan in the presence of oxygen in such a way as to give only 4 per cent saturation of the double bonds. A sample of this latex coagulated to a soft rubber, but it was sticky and hard to process. The streams were combined, however, and processing was carried out normally. The final polymer milled without difficulty and produced superior vulcanized products.

The above examples were carried out using a standard GR—S recipe. This recipe had the following composition:

| | Parts by weight |
|---|---|
| Butadiene | 75 |
| Styrene | 25 |
| Soap | 5 |
| Potassium persulfate | 0.3 |
| Dodecyl mercaptan | 0.3 |
| Water | 180 |

The latex was formed by carrying out the polymerization at 122° F. for about 12 hours.

Other latices produced by emulsion polymerization such as the acrylonitrile-butadiene copolymer (GR–A), and in general any synthetic rubber produced from a conjugated diolefin of the butadiene-1,3 type may be reacted with or added to the mercaptan in a similar manner.

I claim:

1. A process for preparing a plastic synthetic rubber-like material, which comprises polymerizing a conjugated diolefin in aqueous emulsion to form a latex containing a synthetic rubber-like polymer in dispersion, separating said latex into a major portion and a minor portion, reacting said minor portion in the presence of an oxidizing agent with an alkyl mercaptan having not more than sixteen carbon atoms per molecule in an amount such that the double bonds of the rubber in said latex are saturated to an extent between 10 and 65 per cent by addition of mercaptan thereto and such that the resulting product is a liquid syrup when separated from said latex, recombining the resultant mercaptan-treated latex with said major portion of the original latex, and coagulating the resultant mixture to separate a plasticized synthetic rubber-like material.

2. A process according to claim 1 wherein the conjugated diolefin is copolymerized with material copolymerizable therewith and having an ethylenic linkage.

3. A process according to claim 1 wherein the conjugated diolefin is butadiene-1,3 and said butadiene-1,3 is copolymerized with an unsaturated material copolymerizable therewith having a single ethylenic linkage.

4. A process according to claim 1, wherein the conjugated diolefin is butadiene-1,3 and wherein said diolefin is copolymerized with styrene.

5. A process for preparing a latex of a plasticized synthetic rubber, which comprises polymerizing a conjugated diolefin in aqueous emulsion to form a latex containing a synthetic rubber-like polymer in dispersion, separating from said latex a minor portion thereof and reacting same in the presence of an oxidizing agent with an alkyl mercaptan having not more than sixteen carbon atoms per molecule in an amount such that the double bonds of the rubber in said latex are saturated to an extent between 10 and 65 per cent by addition of mercaptan thereto and such that the resulting product is a liquid syrup when separated from said latex, and recombining a reacted portion of said latex with an unreacted portion.

6. A process for preparing a plasticized synthetic rubber which comprises reacting an aqueous dispersion of a synthetic rubber-like material, produced by the aqueous emulsion copolymerization of a conjugated diolefin and an unsaturated material copolymerizable therewith having a single ethylenic linkage, with an alkyl mercaptan having from 1 to 16 carbon atoms, to form a reaction addition product of said mercaptan in an amount such that the double bonds of the copolymer in said dispersion are saturated to an extent between 10 and 65 per cent by addition of mercaptans thereto, admixing the thus treated dispersion with a desired larger quantity of untreated dispersion of the same type as that reacted with said mercaptan, and coagulating the resultant mixture to separate a plasticized synthetic rubber.

7. A process according to claim 5 wherein the alkyl mercaptan is ethyl mercaptan.

8. A process according to claim 5 wherein the alkyl mercaptan is dodecyl mercaptan.

9. A process according to claim 5 wherein the alkyl mercaptan is tert-butyl mercaptan.

10. In a process for preparing a synthetic rubber by emulsion copolymerization of 1,3-butadiene and styrene, whereby a latex containing synthetic rubber is produced, the improvement which comprises dividing such a latex into two portions in a ratio between 95:5 and 80:20, reacting with the smaller portion normal dodecyl mercaptan at a reaction temperature between 30 and 150° F. for a reaction time of 1 to 24 hours in the presence of an oxidizing agent and with an amount of said mercaptan such that the double bonds of the rubber in said latex are saturated to an extent between 10 and 65 per cent by addition of mercaptan thereto and the resulting product has a syrupy consistency, when separated from said latex, separating unreacted mercaptan from resulting reacted latex, admixing said reacted latex with the larger portion of said original, unreacted latex, and recovering from the combined latex a resulting synthetic rubber product.

11. In a process for preparing a synthetic rubber by emulsion copolymerization of a conjugated diolefin, whereby a latex containing synthetic rubber is produced, the improvement which comprises dividing such a latex into two portions in a ratio between 95:5 and 80:20, reacting with the smaller portion an alkyl mercaptan having not more than sixteen carbon atoms per molecule at a reaction temperature between 30 and 150° F. for a reaction time of 1 to 24 hours in the presence of an oxidizing agent and with an amount of said mercaptan such that the double bonds of the rubber in said latex are saturated to an extent between 10 and 65 per cent by addition of mercaptan thereto, and admixing said reacted latex with the larger portion of said original, unreacted latex.

CHARLES F. FRYLING.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,316,949 | Garvey | Apr. 20, 1943 |
| 2,407,953 | Dreisbach | Sept. 17, 1946 |
| 2,411,954 | Burke | Dec. 3, 1946 |
| 2,425,840 | Schulze et al. | Aug. 19, 1947 |
| 2,463,224 | Vincent | Mar. 1, 1949 |

FOREIGN PATENTS

| Number | Country | Date |
|---|---|---|
| 390,532 | Great Britain | Apr. 7, 1944 |
| 705,104 | Germany | Apr. 17, 1941 |